(12) United States Patent
Melnik et al.

(10) Patent No.: US 12,073,615 B2
(45) Date of Patent: Aug. 27, 2024

(54) METHOD, APPARATUS, AND COMPUTER PROGRAM PRODUCT FOR IDENTIFYING OBJECTS OF INTEREST WITHIN AN IMAGE CAPTURED BY A RELOCATABLE IMAGE CAPTURE DEVICE

(71) Applicant: HERE Global B.V., Eindhoven (NL)

(72) Inventors: Ofer Melnik, Weehawken, NJ (US); Mark Thompson, Lake Forest Park, WA (US); Alastair Sutherland, Seattle, WA (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 17/123,485

(22) Filed: Dec. 16, 2020

(65) Prior Publication Data

US 2022/0188547 A1 Jun. 16, 2022

(51) Int. Cl.
*G06V 20/20* (2022.01)
*G06V 20/30* (2022.01)
*H04N 23/80* (2023.01)

(52) U.S. Cl.
CPC .............. *G06V 20/20* (2022.01); *G06V 20/30* (2022.01); *H04N 23/80* (2023.01)

(58) Field of Classification Search
CPC ........... G06V 10/467; H04N 21/44008; H04N 5/23218
See application file for complete search history.

(56) References Cited

U.S. PATENT DOCUMENTS 8,131,118 B1 3/2012 Jing et al.
8,625,902 B2 * 1/2014 Baheti ................. G06V 10/462
382/190

(Continued)

FOREIGN PATENT DOCUMENTS

CN 101535986 A * 9/2009 ........... G06F 16/532
CN 110263746 A * 9/2019 ........... G06F 16/434

(Continued)

OTHER PUBLICATIONS

Nirikin et al., "HyperSeg: Patch-Wise Hypernetwork for Real-Time Semantic Segmentation", 2021 IEEE/CVF Conference on Computer Vision and Pattern Recognition (CVPR), arXiv:2012.11582v2, (Apr. 8, 2021), 15 pages.

(Continued)

*Primary Examiner* — Christopher K Peterson
(74) *Attorney, Agent, or Firm* — ALSTON & BIRD LLP

(57) ABSTRACT

A method, apparatus and computer program product identify objects of interest within images. In a method, the method receives one or more images generated by an image capture device that is configured to be relocated. The method also receives information regarding an estimated location of the image capture device. Based upon a representation of a respective image of the one or more images and respective representations of a plurality of reference images, the method identifies one or more reference images that are associated with the estimated location. The method also identifies an object of interest within the respective image generated by the image capture device based upon respective digital signatures of one or more objects of interest and at least some context associated with the one or more objects of interest that are depicted by the one or more reference images that have been identified.

18 Claims, 4 Drawing Sheets

(56) References Cited

U.S. PATENT DOCUMENTS

| | | | |
|---|---|---|---|
| 9,292,509 | B2 | 3/2016 | Betz |
| 10,452,071 | B1 | 10/2019 | Ebrahimi et al. |
| 10,726,312 | B2* | 7/2020 | Butt .................... G06V 10/454 |
| 10,916,001 | B2 | 2/2021 | Lu et al. |
| 11,113,587 | B2* | 9/2021 | Butt .................... G06V 10/764 |
| 11,641,354 | B2 | 5/2023 | Soon-Shiong et al. |
| 2011/0060666 | A1 | 3/2011 | Gromek et al. |
| 2011/0135191 | A1* | 6/2011 | Lyuh .................... G06V 20/56 382/159 |
| 2012/0027290 | A1* | 2/2012 | Baheti ................ G06V 30/2504 382/154 |
| 2012/0166074 | A1* | 6/2012 | Weng ................ G01C 21/3811 707/792 |
| 2014/0133310 | A1 | 5/2014 | Pau |
| 2014/0281945 | A1 | 9/2014 | Avni et al. |
| 2015/0278224 | A1 | 10/2015 | Jaber et al. |
| 2016/0300118 | A1 | 10/2016 | Murray et al. |
| 2018/0101730 | A1* | 4/2018 | Wu .................... H04N 5/23293 |
| 2018/0137551 | A1 | 5/2018 | Zheng et al. |
| 2018/0150947 | A1 | 5/2018 | Lu et al. |
| 2018/0157939 | A1* | 6/2018 | Butt .................... G06V 10/454 |
| 2018/0189706 | A1 | 7/2018 | Newhouse et al. |
| 2018/0204083 | A1* | 7/2018 | Goyal ................ G06V 10/17 |
| 2018/0225514 | A1* | 8/2018 | Anastassacos ........ G06V 20/36 |
| 2018/0227482 | A1* | 8/2018 | Holzer .................... G06V 20/10 |
| 2018/0373959 | A1 | 12/2018 | Rhoads et al. |
| 2019/0073553 | A1 | 3/2019 | Yao et al. |
| 2019/0122072 | A1 | 4/2019 | Cricri et al. |
| 2019/0147655 | A1 | 5/2019 | Galera et al. |
| 2019/0272284 | A1* | 9/2019 | Jaber .................... G06F 16/583 |
| 2019/0302290 | A1 | 10/2019 | Alwon |
| 2019/0303725 | A1 | 10/2019 | Gurvich et al. |
| 2020/0005542 | A1* | 1/2020 | Kocharlakota ........... G06T 7/70 |
| 2020/0183047 | A1 | 6/2020 | Denli et al. |
| 2020/0193206 | A1* | 6/2020 | Turkelson ................ G06T 5/009 |
| 2020/0225673 | A1 | 7/2020 | Ebrahimi Afrouzi et al. |
| 2020/0234466 | A1* | 7/2020 | Holzer ........................ G06T 7/73 |
| 2020/0320356 | A1* | 10/2020 | Butt .................... G06V 10/75 |
| 2020/0401617 | A1 | 12/2020 | Spiegel et al. |
| 2020/0402541 | A1 | 12/2020 | Talbot et al. |
| 2021/0004589 | A1* | 1/2021 | Turkelson ............... G06V 10/82 |
| 2021/0056761 | A1* | 2/2021 | Nigam ................ G06F 3/0383 |
| 2021/0141793 | A1 | 5/2021 | Kar et al. |
| 2021/0281569 | A1 | 9/2021 | Soon-Shiong et al. |
| 2021/0335050 | A1 | 10/2021 | Zavesky et al. |
| 2022/0060451 | A1 | 2/2022 | Kashyap et al. |
| 2022/0132095 | A1* | 4/2022 | Leung .................... H04N 13/271 |
| 2022/0188346 | A1* | 6/2022 | Melnik ................ G06F 16/535 |
| 2022/0198215 | A1* | 6/2022 | Melnik .................. G06N 20/00 |
| 2022/0198701 | A1* | 6/2022 | Melnik ................ G06T 19/006 |
| 2022/0198721 | A1* | 6/2022 | Melnik ............... G06F 16/5854 |
| 2023/0186517 | A1 | 6/2023 | Melnik et al. |

FOREIGN PATENT DOCUMENTS

| | | | | |
|---|---|---|---|---|
| KR | | 102266996 B1 * | 6/2021 | ............ G06V 10/22 |
| WO | WO 2017/156043 | A1 | 9/2017 | |
| WO | WO 2018/031050 | A1 | 2/2018 | |
| WO | WO 2020/020472 | A1 | 1/2020 | |

OTHER PUBLICATIONS

Chaudhury et al., Auto-Rectification of Users Photos, https://static.googleusercontent.com/media/research.google.com/en//pubs/archive/42532.pdf.

U.S. Appl. No. 17/123,935, filed Dec. 16, 2020, In re: Melnik et al. entitled, "Method, Apparatus, and Computer Program Product for Training a Signature Encoding Module and a Query Processing Module to Identify Objects of Interest Within an Image Utilizing Digital Signatures".

Alfarrarjeh et al., "A Data-Centric Approach for Image Scene Localization", 2018 IEEE International Conference on Big Data, (Dec. 10-13, 2018), pp. 594-603.

Extended European Search Report for European Application No. 21214679.9 dated May 13, 2022, 12 pages.

Extended European Search Report for European Application No. 21214761.5 dated May 13, 2022, 12 pages.

Extended European Search Report for European Application No. 21216006.3 dated May 23, 2022, 8 pages.

Extended European Search Report for European Application No. 21216037.8 dated Jun. 7, 2022, 7 pages.

Hu et al., "ALPS Accurate Landmark Positioning at City Scales", ACM International Joint Conference on Pervasive and Ubiquitous Computing (UbiComp 2016), (Jul. 2016), 12 pages.

Luo et al., "Geotagging in Multimedia and Computer Vision—A Survey", Multimed Tools Appl, (Oct. 19, 2010), 25 pages.

Sagrebin et al., "Real-Time Moving Object Detection for Video Surveillance", 2009 Sixth IEEE International Conference on Advanced Video and Signal Based Surveillance, (Sep. 2-4, 2009), 6 pages.

Zhang et al., "Parallel Connecting Deep Shallow CNNs for Simultaneous Detection of Big and Small Objects", Pattern Recognition and Computer Vision (PRCV 2018), Lecture Notes in Computer Science, (Nov. 2, 2018), 12 pages.

Notice of Allowance for U.S. Appl. No. 17/132,876 dated Aug. 25, 2022.

Notice of Allowance for U.S. Appl. No. 17/132,876 dated Oct. 19, 2022.

Non-Final Office Action for U.S. Appl. No. 17/123,935 dated May 10, 2023.

Non-Final Office Action for U.S. Appl. No. 17/132,911 dated Mar. 6, 2023.

Non-Final Office Action for U.S. Appl. No. 17/132,860 dated Mar. 13, 2023.

Extended European Search Report for European Application No. 22211724.4 dated Apr. 13, 2023, 11 pages.

Notice of Allowance for U.S. Appl. No. 17/132,911 dated Jul. 12, 2023.

Corrected Notice of Allowance for U.S. Appl. No. 17/132,911 dated Jul. 20, 2023.

Notice of Allowance for U.S. Appl. No. 17/132,860 dated Jul. 13, 2023.

Notice of Allowance for U.S. Appl. No. 17/123,935 dated Sep. 25, 2023.

Office Action for European Application No. 21214679.9 dated Dec. 12, 2023, 9 pages.

Office Action for European Application No. 21214761.5 dated Dec. 12, 2023, 7 pages.

Notice of Allowance for U.S. Appl. No. 17/544,039 dated Jan. 18, 2024.

Notice of Allowance for U.S. Appl. No. 18/164,259 dated May 17, 2024, 8 pages.

Notice of Allowance for U.S. Appl. No. 18/164,259 dated May 30, 2024, 5 pages.

* cited by examiner

METHOD, APPARATUS, AND COMPUTER PROGRAM PRODUCT FOR IDENTIFYING OBJECTS OF INTEREST WITHIN AN IMAGE CAPTURED BY A RELOCATABLE IMAGE CAPTURE DEVICE

TECHNOLOGICAL FIELD

An example embodiment relates generally to a method, apparatus, and computer program product for identifying objects of interest within an image and, more particularly, for identifying an object of interest within an image captured by an image capture device that is configured to be relocated utilizing respective digital signatures of one or more objects of interest and at least some context associated with the one or more objects of interest that are depicted by reference images.

BACKGROUND

Applications of Augmented Reality (AR) typically involve superimposing a computer-generated image on a user's view of the real world, thus providing a composite view. In some examples, three-dimensional (3D) video may be enhanced in real-time by overlaying a camera image with additional data related to what is being shown in the video.

Approaches to such enhancements have revolved around 3D mapping and 3D positioning. For example, one approach may involve mapping continuous video to 3D point clouds while localizing within the 3D point clouds. However, approaches such as these are difficult to scale since the type and amount of data that is generated imposes significant demands upon the amount of processing power needed to process such data, particularly in real-time.

Effectively identifying objects of interest within images in real-time may be difficult, particularly in circumstances in which the images are generated by an image capture device that is moving or otherwise frequently changing positions since the mapping and localizing processes become increasingly more processing intensive and time consuming.

BRIEF SUMMARY

A method, apparatus and computer program product are therefore provided in accordance with an example embodiment in order to utilize digital signatures to identify objects of interest within images, for example, images generated by an image capture device that is configured to be relocated. Embodiments herein may utilize portable compact signatures that allow objects of interest to be recognized and highlighted within images in an efficient manner. As such, real-time detection of objects of interest from images, particularly images generated from a moving image capture device, may be performed faster and more efficiently than other approaches, such as approaches that perform 3D localization for data stored in a 3D point cloud utilizing, for example, exhaustive back end processing. Advantageously, the digital signatures may be compact and thus can be stored and delivered as needed on edge devices, making digital signatures useful for many applications that are dependent upon the identification of objects of interest within images.

In an embodiment, a method is provided that includes receiving one or more images generated by an image capture device that is configured to be relocated. The method also includes receiving information regarding an estimated location of the image capture device. The method also includes, based upon a representation of a respective image of the one or more images and respective representations of a plurality of reference images, identifying one or more reference images that are associated with the estimated location. The method further includes identifying an object of interest within the respective image generated by the image capture device based upon respective digital signatures of one or more objects of interest and at least some context associated with the one or more objects of interest that are depicted by the one or more reference images that have been identified.

In some embodiments, the object of interest within the respective image is identified by a query processing module comprising a neural network that has been trained to recognize the object of interest utilizing the respective digital signature of the one or more objects of interest and at least some context associated with the one or more objects of interest that are depicted by the one or more reference images that have been identified.

The method of an example embodiment further includes augmenting the respective image generated by the image capture device based upon the object of interest that has been identified therein. In some embodiments, augmenting the respective image generated by the image capture device comprises providing an overlay, such as of a representation of the object of interest that has been identified based upon the respective digital signature, upon the respective image generated by the image capture device. In some embodiments, the method further includes determining a defined location of at least one of the object of interest within the respective image or the image capture device based upon locations associated with the one or more objects of interest that are depicted by the one or more reference images that have been identified.

In accordance with an example embodiment, identifying one or more reference images comprises generating an encoded representation of the respective image and comparing the encoded representation of the respective image to encoded representations of the plurality of reference images to identify the one or more reference images. In this example embodiment, identifying one or more reference images may include separately applying a distance function to the encoded representation of the respective image and each of the encoded representations of the reference images, and the comparing may include comparing a result of the distance function between the encoded representation of the respective image and each of the encoded representations of the reference images.

The method of an example embodiment further includes identifying the plurality of reference images based upon respective locations associated with the plurality of reference images being within a predefined distance and orientation of the estimated location and orientation of the image capture device.

The method of an example embodiment further includes accessing the respective representations of the plurality of reference images and the respective digital signatures of one or more objects of interest that are depicted by the one or more reference images that have been identified. In this example embodiment, the respective representations of the plurality of reference images and the respective digital signatures of one or more objects of interest have been previously generated and stored in advance of receiving the respective image generated by the image capture device.

At least some of the one or more objects of interest that are depicted by the one or more reference images may be hierarchical. A hierarchical object of interest further defines one or more sub-objects of interest associated therewith, with respective digital signatures associated with the one or more sub-objects of interest. In this example embodiment, the method further includes identifying a sub-object of interest within the object of interest that has been identified based upon respective digital signatures of the one or more sub-objects of interest.

In a further embodiment, an apparatus is provided that includes means for receiving one or more images generated by an image capture device that is configured to be relocated. The apparatus also includes means for receiving information regarding an estimated location of the image capture device. The apparatus further includes means for, based upon a representation of a respective image of the one or more images and respective representations of a plurality of reference images, identifying one or more reference images that are associated with the estimated location. The apparatus also includes means for identifying an object of interest within the respective image generated by the image capture device based upon respective digital signatures of one or more objects of interest and at least some context associated with the one or more objects of interest that are depicted by the one or more reference images that have been identified.

In some embodiments, the means for identifying an object of interest within the respective image generated by the image capture device comprises a query processing module comprising a neural network that has been trained to recognize the object of interest utilizing the respective digital signature of the one or more objects of interest and at least some context associated with the one or more objects of interest that are depicted by the one or more reference images that have been identified.

The apparatus of an example embodiment may further include means for augmenting the respective image generated by the image capture device based upon the object of interest that has been identified therein. In some embodiments, the means for augmenting the respective image generated by the image capture device comprises means for providing an overlay, such as of a representation of the object of interest that has been identified based upon the respective digital signature, upon the image generated by the image capture device.

The apparatus of an example embodiment further includes means for determining a defined location of at least one of the object of interest within the respective image or the image capture device based upon locations associated with the one or more objects of interest that are depicted by the one or more reference images that have been identified.

In some embodiments, the means for identifying one or more reference images comprises means for generating an encoded representation of the respective image and comparing the encoded representation of the image to encoded representations of the plurality of reference images to identify the one or more reference images. In this example embodiment, the means for identifying one or more reference images may include means for separately applying a distance function to the encoded representation of the respective image and each of the encoded representations of the reference images, and the means for comparing may include means for comparing a result of the distance function between the encoded representation of the respective image and each of the encoded representations of the reference images.

The apparatus of an example embodiment further includes means for identifying the plurality of reference images based upon respective locations associated with the plurality of reference images being within a predefined distance and orientation of the estimated location and orientation of the image capture device.

The apparatus of an example embodiment further includes means for accessing the respective representations of the plurality of reference images and the respective digital signatures of one or more objects of interest that are depicted by the one or more reference images that have been identified. In this example embodiment, the respective representations of the plurality of reference images and the respective digital signatures of one or more objects of interest have been previously generated and stored in advance of receiving the image generated by the image capture device.

At least some of the one or more objects of interest that are depicted by the one or more reference images may be hierarchical. A hierarchical object of interest further defines one or more sub-objects of interest associated therewith, with respective digital signatures associated with the one or more sub-objects of interest. In this example embodiment, the apparatus further includes means for identifying a sub-object of interest within the object of interest that has been identified based upon respective digital signatures of the one or more sub-objects of interest.

In a further embodiment, an apparatus is provided that includes processing circuitry and at least one memory including computer program code instructions, with the computer program code instructions configured to, when executed by the processing circuitry, cause the apparatus to receive one or more images generated by an image capture device that is configured to be relocated. The computer program code instructions are also configured to, when executed by the processing circuitry, cause the apparatus to receive information regarding an estimated location of the image capture device. The computer program code instructions are further configured to, when executed by the processing circuitry, cause the apparatus to, based upon a representation of a respective image of the one or more images and respective representations of a plurality of reference images, identify one or more reference images that are associated with the estimated location. The computer program code instructions are also configured to, when executed by the processing circuitry, cause the apparatus to identify an object of interest within the respective image generated by the image capture device based upon respective digital signatures of one or more objects of interest and at least some context associated with the one or more objects of interest that are depicted by the one or more reference images that have been identified.

In some embodiments, the processing circuitry further comprises a query processing module comprising a neural network that has been trained to recognize the object of interest utilizing the respective digital signature of the one or more objects of interest and at least some context associated with the one or more objects of interest that are depicted by the one or more reference images that have been identified.

The computer program code instructions are further configured to, when executed by the processing circuitry, cause the apparatus of an example embodiment to augment the respective image generated by the image capture device based upon the object of interest that has been identified therein. In some embodiments, the computer program code instructions are configured to, when executed by the processing circuitry, cause the apparatus to augment the respective image generated by the image capture device by providing an overlay, such as of a representation of the object of interest that has been identified based upon the respective digital signature, upon the respective image generated by the image capture device.

The computer program code instructions are further configured to, when executed by the processing circuitry, cause the apparatus of an example embodiment to determine a defined location of at least one of the object of interest within the respective image or the image capture device based upon locations associated with the one or more objects of interest that are depicted by the one or more reference images that have been identified.

In some embodiments, the computer program code instructions configured to cause the apparatus to identify one or more reference images comprise computer program code instructions configured to, when executed by the processing circuitry, cause the apparatus to generate an encoded representation of the respective image and compare the encoded representation of the image to encoded representations of the plurality of reference images to identify the one or more reference images.

The computer program code instructions are further configured to, when executed by the processing circuitry, cause the apparatus of an example embodiment to identify the plurality of reference images based upon respective locations associated with the plurality of reference images being within a predefined distance and orientation of the estimated location and orientation of the image capture device.

The computer program code instructions are further configured to, when executed by the processing circuitry, cause the apparatus of an example embodiment to access the respective representations of the plurality of reference images and the respective digital signatures of one or more objects of interest that are depicted by the one or more reference images that have been identified. The respective representations of the plurality of reference images and the respective digital signatures of one or more objects of interest have been previously generated and stored in advance of receiving the respective image generated by the image capture device.

In yet another example embodiment, a computer program product is provided that includes at least one non-transitory computer-readable storage medium having computer-executable program code instructions stored therein with the computer-executable program code instructions comprising program code instructions configured to receive one or more images generated by an image capture device that is configured to be relocated. The computer-executable program code instructions further comprise program code instructions configured to receive information regarding an estimated location of the image capture device. The computer-executable program code instructions further comprise program code instructions configured to, based upon a representation of a respective image of the one or more images and respective representations of a plurality of reference images, identify one or more reference images that are associated with the estimated location. The computer-executable program code instructions further comprise program code instructions configured to identify an object of interest within the respective image generated by the image capture device based upon respective digital signatures of one or more objects of interest and at least some context associated with the one or more objects of interest that are depicted by the one or more reference images that have been identified.

In some embodiments, the program code instructions configured to identify an object of interest within the respective image generated by the image capture device are embodied by a trained query processing module comprising a neural network that has been trained to recognize the object of interest utilizing the respective digital signature of the one or more objects of interest and at least some context associated with the one or more objects of interest that are depicted by the one or more reference images that have been identified.

The computer-executable program code instructions of an example embodiment further comprise program code instructions configured to augment the respective image generated by the image capture device based upon the object of interest that has been identified therein. In this example embodiment, the computer-executable program code instructions may further comprise program code instructions configured to augment the respective image generated by the image capture device based upon the object of interest that has been identified therein.

The computer-executable program code instructions of an example embodiment further comprise program code instructions configured to augment the respective image generated by the image capture device by providing an overlay, such as of a representation of the object of interest that has been identified based upon the respective digital signature, upon the respective image generated by the image capture device.

The computer-executable program code instructions of an example embodiment further comprise program code instructions configured to determine a defined location of at least one of the object of interest within the respective image or the image capture device based upon locations associated with the one or more objects of interest that are depicted by the one or more reference images that have been identified.

In some embodiments, the computer program code instructions configured to cause the apparatus to identify one or more reference images further comprise program code instructions configured to generate an encoded representation of the respective image and compare the encoded representation of the image to encoded representations of the plurality of reference images to identify the one or more reference images. In this example embodiment, the computer-executable program code instructions may further comprise program code instructions configured to identify the plurality of reference images based upon respective locations associated with the plurality of reference images being within a predefined distance and orientation of the estimated location and orientation of the image capture device.

The computer-executable program code instructions of an example embodiment further comprise program code instructions configured to access the respective representations of the plurality of reference images and the respective digital signatures of one or more objects of interest that are depicted by the one or more reference images that have been identified. The respective representations of the plurality of reference images and the respective digital signatures of one or more objects of interest have been previously generated and stored in advance of receiving the image generated by the image capture device.

BRIEF DESCRIPTION OF THE DRAWINGS

Figure 1:
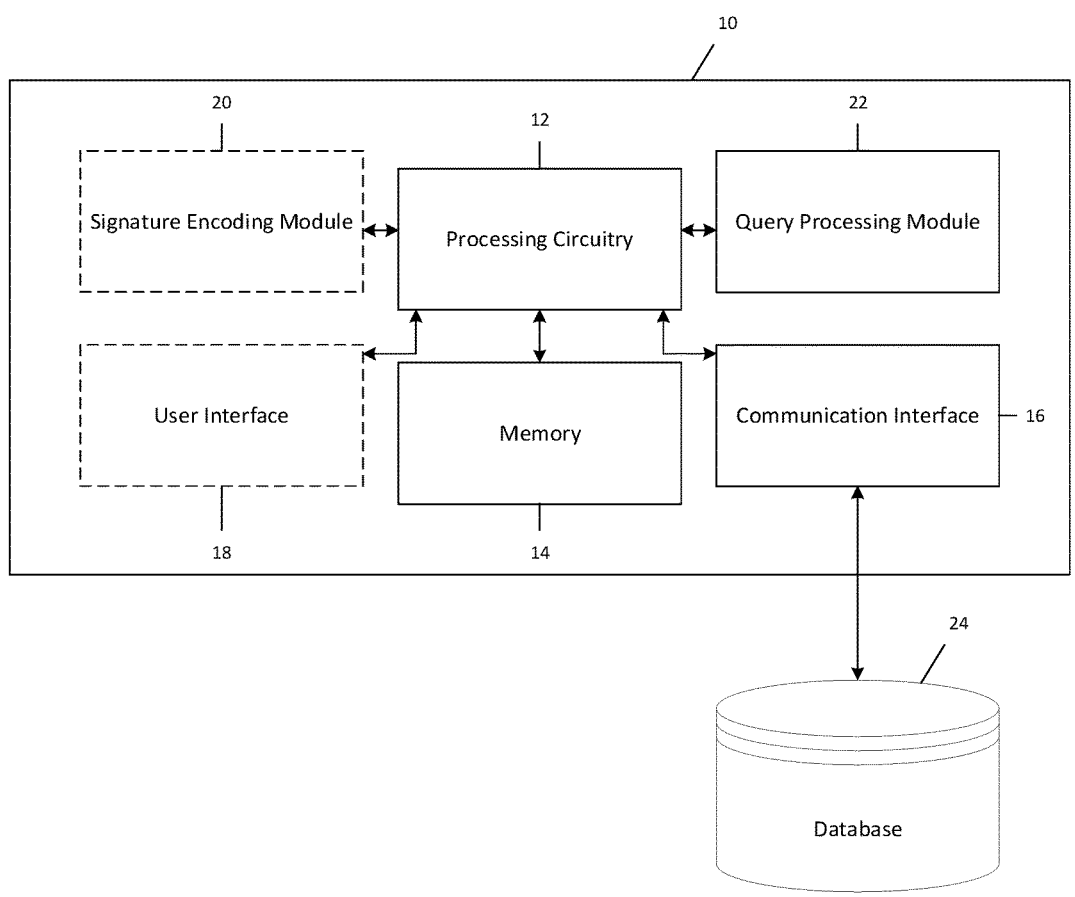
Figure 2:
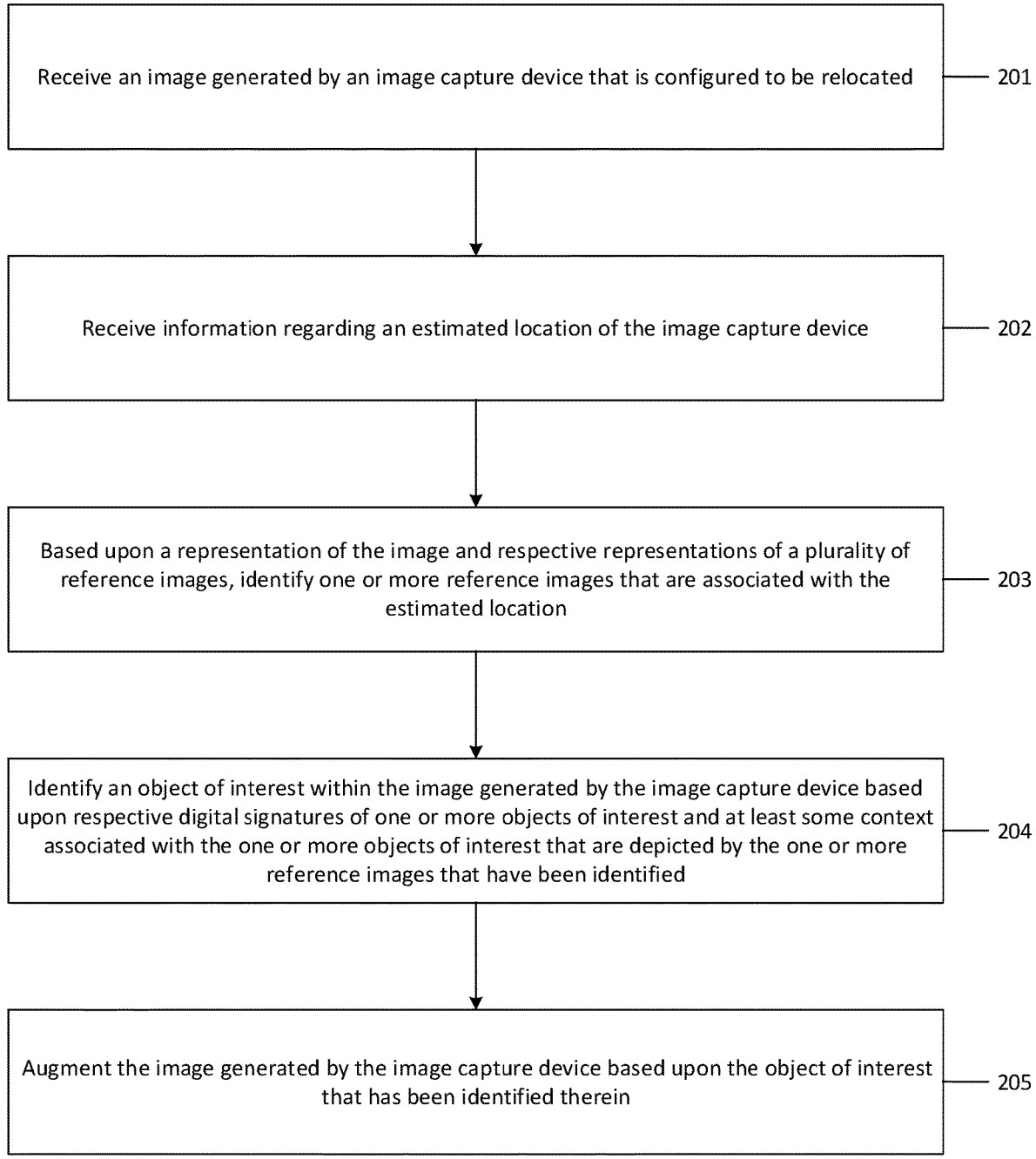
Figure 3:
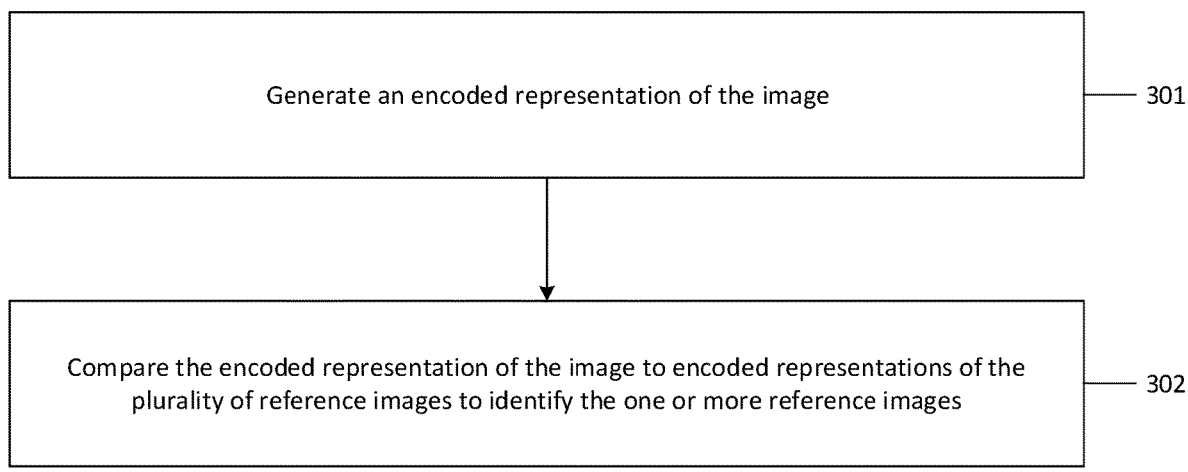
Figure 4:
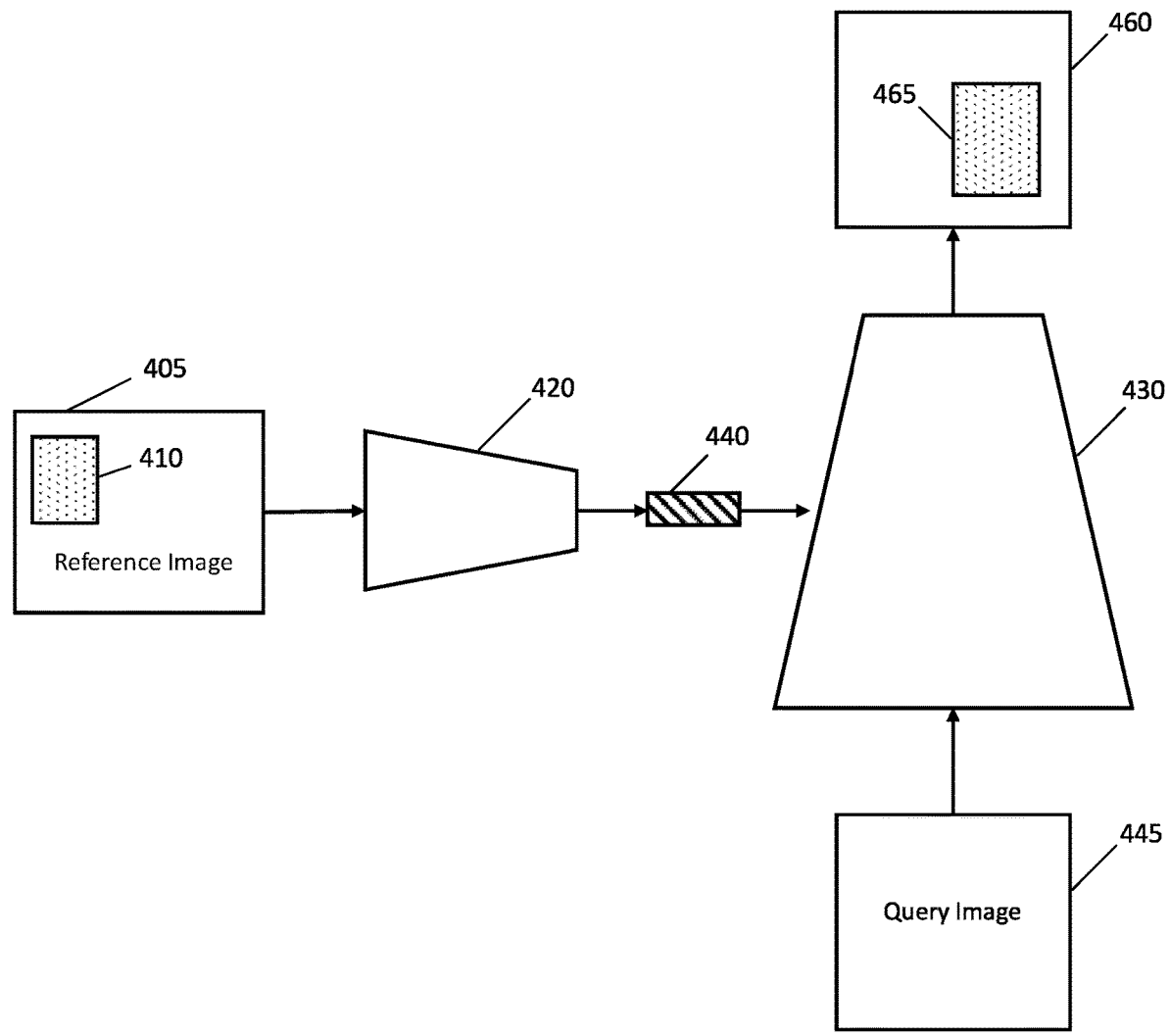

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a flowchart illustrating the operations performed, such as by the apparatus of FIG. 1, in accordance with an example embodiment;

FIG. 3 is a flowchart illustrating the operations performed, such as by the apparatus of FIG. 1, in accordance with another example embodiment; and FIG. 4 is a graphical representation of operations performed, such as by the apparatus of FIG. 1, for training a signature encoding module and query processing module in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to identify an object of interest within an image that has been captured by an image capture device that is configured to be relocated. The object of interest may be identified based upon respective digital signatures of one or more objects of interest and at least some context associated with the one or more objects of interest that are depicted by one or more reference images. In some embodiments, the object of interest within the image is identified by a query processing module comprising a neural network that has been trained as described below to recognize the object of interest utilizing the respective digital signature of the one or more objects of interest and at least some context associated with the one or more objects of interest that are depicted by the one or more reference images that have been identified. In this regard, the method, apparatus, and computer program product may be configured to utilize a trained query processing module to identify objects of interest within an image.

The apparatus that is configured to identify an object of interest within an image based upon respective digital signatures of one or more objects of interest and at least some context associated with the one or more objects of interest that are depicted by the one or more reference images may be any of a wide variety of computing devices. For example, the apparatus may be embodied by a server, a computer workstation, a distributed network of computing devices, a personal computer, a navigation or mapping system, or any other type of computing device.

Regardless of the manner in which the apparatus is embodied, however, the apparatus 10 includes, is associated with, or is in communication with processing circuitry 12, memory 14, a communication interface 16, a query processing module 22, and optionally a user interface 18 and a signature encoding module 20, as shown in FIG. 1. In some embodiments, the processing circuitry 12 (and/or co-processors or any other processors assisting or otherwise associated with the processing circuitry) can be in communication with the memory 14 via a bus for passing information among components of the apparatus. The memory 14 can be non-transitory and can include, for example, one or more volatile and/or non-volatile memories. In other words, for example, the memory 14 may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory 14 can be configured to buffer input data for processing by the processing circuitry 12. Additionally or alternatively, the memory can be configured to store instructions for execution by the processing circuitry.

The processing circuitry 12 can be embodied in a number of different ways. For example, the processing circuitry 12 may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 12 can include one or more processing cores configured to perform independently. A multi-core processor can enable multiprocessing within a single physical package. Additionally or alternatively, the processing circuitry 12 can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry 12 can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., map data, route data, etc.) generated and/or employed by the processing circuitry 12. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to infrastructure wireless links.

Although not illustrated, the apparatus 10 may also include or be in communication with one or more a positioning system, such as a global positioning system (GPS) and/or other localization system. As such, the apparatus 10, such as the processing circuitry 12, may be configured to determine its location, such as upon capture of an image, based upon information provided by the positioning system.

The apparatus 10 may also optionally comprise a signature encoding module 20. The signature encoding module may be configured to perform operations associated with generating a digital signature of an object of interest and associated context during a training process. As described below, during training, the signature encoding module 20 may receive, as input, a reference image that includes an object of interest that has been demarcated and be trained to provide, as output, a digital signature representing the object of interest and at least some of the context associated with the object of interest.

The apparatus 10 may also comprise a query processing module 22. The query processing module 22 may be configured to perform operations associated with identifying an object of interest within an image based upon respective digital signatures of one or more objects of interest and at least some context associated with the one or more objects of interest that are depicted by one or more reference images. The query processing module 22 may be a trained to identify objects of interest within images. As described in more detail below, during training, the query processing module may receive, as input, one or more query images in addition to a digital signature of a respective object of interest, such as a digital signature generated by the signature encoding module 20 and stored by the memory 14 and/or a database 24. Based thereupon, the query processing module may be trained to predict a location in the one or more query images that contains the object of interest. Once trained, the query processing module may be configured to efficiently identify an object of interest within an image based upon respective digital signatures of one or more objects of interest and at least some context associated with the one or more objects of interest that are depicted by one or more reference images.

Although depicted in FIG. 1 to be distinct from the processing circuitry 12, the signature encoding module 20 and/or the query processing module 22 may be embodied by the processing circuitry in other example embodiments.

In some embodiments, the database 24 may be configured to store representations of a plurality of images and associated metadata. In some embodiments, the representations of the plurality of images may be encoded representations, such as the hash codes, generated for the respective images, although different or additional representations of the images may be stored in the database in other embodiments including storage of the images themselves. The metadata for the plurality of images may comprise location data (e.g., GPS coordinates) that defines the location at which the image was taken. The metadata for the plurality of images may also comprise camera-related information, such as a camera orientation at the time that the image was captured and/or other camera-related information.

The database 24 may also store one or more digital signatures associated with respective images. The digital signatures are representative of an object of interest within a respective image, as well as at least some of the context associated with the object of interest within the image. One or more digital signatures may be associated with each image. In an embodiment in which multiple digital signatures are associated with a respective image, each digital signature may be representative of a different object of interest and at least some context associated therewith within the object of interest. The digital signatures may have been generated by the signature encoding module 20, as described in more detail below.

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Referring now to FIG. 2, the operations performed, such as by the apparatus 10 of FIG. 1, in order to identify an object of interest within an image are depicted. As shown in block 201, the apparatus includes means, such as the processing circuitry 12, memory 14, communication interface 16, and/or the like, for receiving one or more images generated by an image capture device that is configured to be relocated. The one or more images may be received from a source external to and in communication with the apparatus (e.g., by way of communication interface 16), such as an image capture device, or, in some embodiments, the image may be received from the database 24 or memory 14 that store one or more images captured by the image capture device, and/or from other sources. Although the apparatus may receive a plurality of images that are processed concurrently or in combination with one another, the apparatus will be described below in relation to the receipt and processing of single image by way of example, but not of limitation.

For example, the image may be a photograph or frame of a video generated by an image capture device, such as a camera, video camera, or the like. The image capture device may be an image capture device that is configured to be relocated. In this regard, the image capture device may be relocated due to the image capture device being stationed onboard, carried by or embodied by a moving entity, such as a vehicle, drone, person, or the like. For example, the image may depict real-world content and may include one or more objects of interest that can be identified by embodiments described herein. In an instance in which the image capture device is onboard a drone, the object of interest may be an object that the drone is directed to reach or to otherwise home in on.

At block 202, the apparatus 10 includes means, such as the processing circuitry 12, memory 14, communication interface 16, and/or the like, for receiving information regarding an estimated location of the image capture device, such as based upon information provided by an associated positioning system. For example, in some embodiments, the image that is received may be associated with metadata comprising information about the image. For example, the metadata may include location data indicative of a location at which the image was generated. As one example, the location data may comprise a pair of coordinates (e.g., latitudinal/longitudinal coordinates) indicative of a particular location at which the image was generated, such as the location of the image capture device at the time that the image was captured. Additional metadata may include information related to an orientation of the image capture device at the time the image was generated, and/or historical information related to one or more previous locations of the image capture device.

In some embodiments, the apparatus 10 includes means, such as the processing circuitry 12, memory 14, and/or the like, for determining the estimated location based on data associated with the received image. For example, metadata associated with the image as described above and information associated with previous locations of the image capture device (e.g., based on location data of previous images taken by the image capture device) may be combined using a filter, such as a Kalman filter, in order to determine an estimated location of the image capture device.

At operation 203, the apparatus 10 includes means, such as the processing circuitry 12, memory 14, and/or the like, for, based upon a representation of the image that was received following capture by the image capture device and respective representations of a plurality of reference images, identifying one or more reference images that are associated with the estimated location of the image that was received following capture by the image capture device. In this regard, in order to determine one or more objects of interest within the received image, other similarly located images may be analyzed to determine whether the received image includes particular objects of interest.

For example, using the estimated location of the received image, the apparatus 10, such as the processing circuitry 12, may access a database (e.g., database 24) in order to locate representations of images that are similarly located to the received image, e.g., images that were captured at or near the location at which the received image was captured. In this regard, in some embodiments, the apparatus may include means, such as the processing circuitry 12, memory 14, and/or the like, for identifying a plurality of reference images based upon respective locations associated with the plurality of images being within a predefined distance and optionally orientation of the estimated location and orientation of the image capture device at the time at which the received image was captured.

In order to increase the efficiency with which one or more reference images are identified, encoded representations, such as hashed representations, may be utilized to identify one or more reference images, such as from among the plurality of reference images that have been identified to be proximate to, such as within a predefined distance and orientation of, the estimated location and orientation of the image capture device at the time at which the received image was captured. As shown in FIG. 3, at block 301, the apparatus 10 of an example embodiment includes means, such as the processing circuitry 12, memory 14, and/or the like, for generating an encoded representation, such as a hashed representation, of the image that was received following capture by the image capture device. In an embodiment in which the encoded representation is a hashed representation, it is to be appreciated that the hashed representation for the image may be generated using any type of hashing algorithm, including a neural network generated encoding.

At block 302, the apparatus 10 includes means, such as the processing circuitry 12, memory 14, and/or the like, for comparing the encoded representation of the image that was received following capture by the image capture device to encoded representations of the plurality of reference images to identify the one or more reference images. For example, the database 24 may store a plurality of encoded representations of reference images that are utilized for comparative purposes. In some embodiments, the apparatus 10 may identify the one or more reference images through utilization of a distance function. In this regard, the apparatus 10 may include means, such as the processing circuitry 12, memory 14, and/or the like, for separately applying a distance function to the encoded representation of the received image and each of the encoded representations of a plurality of the reference images, such as from among the plurality of reference images that have been identified to be proximate to, such as within a predefined distance and orientation of, the estimated location and orientation of the image capture device at the time at which the received image was captured. In this regard, the apparatus, such as the processing circuitry, may be configured to compare the encoded representations by comparing the result of the distance function between the encoded representation of the received image and each of the encoded representations of the reference images. The reference images having the smallest distance function value, such as from among the plurality of reference images that have been identified to be proximate to, such as within a predefined distance and orientation of, the estimated location and orientation of the image capture device at the time at which the received image was captured, may then be identified for further evaluation.

The respective representations of the plurality of reference images are each associated with a respective digital signature of one or more objects of interest within a respective reference image. The digital signatures have been previously generated, such as by a signature encoding module 20 as described below, and stored in advance of receiving the image generated by the image capture device. In this regard, each of the plurality of reference images may already be associated with one or more respective digital signatures, each of which is a representation of a corresponding object of interest and at least some context associated with the object of interest. As such, the apparatus 10 of an example embodiment also includes means, such as the processing circuitry 12, memory 14, and/or the like, for accessing the respective representations of the plurality of reference images and the respective digital signatures of one or more objects of interest that are depicted by the one or more reference images that have been identified.

In some embodiments, at least some of the one or more objects of interest that are depicted by the one or more reference images may be hierarchical. In this regard, an object of interest may further define one or more sub-objects of interest that are associated therewith. As one example, a hierarchical object of interest comprising a building may define a sub-object of interest representing a doorway entrance to the building. A respective digital signature may be associated not only with the object of interest, but also with the one or more sub-objects of interest with each of the digital signatures of the object of interest and the one or more sub-objects being considered for purposes of identifying the objects or sub-objects of interest that will undergo further evaluation.

Once one or more reference images that are associated with the estimated location have been identified, at block 204, the apparatus 10 includes means, such as the processing circuitry 12, memory 14, query processing module 22, and/or the like, for identifying an object of interest within the image generated by the image capture device based upon respective digital signatures of one or more objects of interest and at least some context associated with the one or more objects of interest that are depicted by the one or more reference images that have been identified. In some embodiments, the apparatus, such as the processing circuitry, the query processing module or the like, may be configured to concurrently process a plurality of images so as to identify a respective object of interest. The use of multiple images can be useful to increase the accuracy with which the object of interest is identified. For example, for a short video clip, the apparatus, such as the processing circuitry, may be configured to process a number of frames of the video clip to improve the performance in regards to identification of an object of interest within any individual frame as information regarding the manner in which one frame is processed may facilitate the processing of other frames and the identification of the same object of interest therein. Although described herein in relation to the receipt and processing of a single image, the apparatus of other example embodiments may similarly receive and process a plurality of images, such as in a concurrent manner or at least in combination or reliance upon one another.

Although the object of interest may be identified in various manners, the object of interest within the image that has been captured by the image capture device may be identified by a trained query processing module 22 in one example embodiment. The query processing module may comprise a deep learning model, such as a neural network, e.g., a convolutional neural network (CNN) and, more particularly, a Residual Neural Network (ResNet). The query processing module of an example embodiment may also comprise a pyramidal structure of neural network layers configured to extract features from one or more query images and to utilize the digital signature to identify the corresponding object of interest within the one or more query images.

The query processing module 22 may be trained by, using: (i) one or more digital signatures of respective objects of interest and the context associated therewith and (ii) one or more query images, identifying the object of interest within the one or more query images based upon the digital signature of the same object of interest in combination with the context with which the object of interest is associated. As used herein, "context" may refer to a portion of an image that is adjacent to or surrounds the object of interest. For example, in an instance in which the object of interest in a reference image is a particular building, the context may comprise one or more buildings or other objects that are in close proximity to the particular building. In an embodiment in which the object of interest is demarcated, such as with an image mask, the context is generally represented by a portion of the reference image that is outside of, but adjacent or otherwise proximate to the image mask. In at least some embodiments, the object of interest is stationary (e.g., a building), and the context surrounding the object of interest is also stationary (e.g., neighboring buildings, locations, or the like).

By taking into account the context associated with an object of interest in the generation of the digital signature, a particular instance of the object of interest may be identified within a query image. For example, in an example embodiment in which the object of interest is a particular franchised restaurant located at a specific location, the generation of a digital signature of the particular restaurant that takes into account the context associated the specific location permits the particular restaurant to be distinguished from other restaurants of the same franchise that are at different locations. Although the different restaurants may all have the same appearance, the context associated with the restaurants is different from one restaurant to another, thereby allowing the digital signature to distinguish the restaurants. By taking the context associated with an object of interest into account in the generation of the digital signature, the query processing module is capable of identifying a particular object of interest within a query image even if occlusions or distortions in the query image prevent the particular object of interest from being fully visible in the query image.

In some embodiments, the method, apparatus 10 and computer program product may be configured to train the query processing module 22 to identify objects of interest within an image by utilizing digital signatures of various objects of interest that have been identified in one or more reference images as well as at least some of the context associated with the objects of interest. Although the digital signatures that are utilized by the query processing module for comparative purposes may be generated in various manners, the method, apparatus and computer program product of an example embodiment are configured to train a signature encoding module 20 to generate a digital signature representative of an object of interest and at least some of the context associated with the object of interest within a reference image and to correspondingly train the query processing module to utilize the digital signature to identify the object of interest within the image captured by an image capture device. In this regard, a trained query processing module may be trained to efficiently recognize and highlight objects of interest within images.

The query processing module 22 may be trained concurrently with a signature encoding module 20, in some embodiments described further below. In some embodiments, the signature encoding module and query processing module may be configured in various manners, but, in one embodiment, are each deep learning models. The respective deep learning models of the signature encoding module and the query processing module may be trained concurrently. As shown in FIG. 4, by way of example, but not of limitation, the signature encoding module 420 and/or the query processing module 430 may each comprise a pyramidal network and, in one embodiment, a CNN, such as a ResNet. In some embodiments, the query processing module 430 may include an aggregating layer configured to combine a digital signature generated by the signature encoding module with a query image 445 decomposition.

The signature encoding module 420 may be configured, using a reference image 405 having an area 410 of the image demarcated (e.g., by masking the reference image) to signify an object of interest (e.g., place of interest, or the like), to generate one or more digital signatures (e.g., sequences of bytes) that represent the object of interest in the context of the reference image. While reference images may be demarcated by using image masks during the training process, it is to be appreciated that other methods of demarcation may be used. As also described below, digital signatures (e.g., digital signatures generated by the signature encoding module 420) are dependent not only upon the object of interest, but also upon at least some of the context associated with the object of interest. This context may include the environment or other surroundings located about the object of interest. In other words, the context associated with an object of interest is context that is visible when viewing the object of interest and, for at least some objects of interest, is external to the object of interest. By way of example, in an instance in which a particular building is the object of interest, the context may include other adjacent buildings as well as other features, e.g., statues, street signs, open spaces, etc., in the vicinity of the building.

During training, a provided reference image 405 depicts an object of interest. For example, the reference image may be an image generated by a camera (e.g., a photograph or a frame from a video) such that the image depicts real-world content (e.g., buildings, roads, signs, landmarks, and/or other objects). In this regard, the object of interest may be content that is desired to be located in one or more other images. The object of interest is stationary in at least some example embodiments.

Further, during training, the reference image may be modified such that the object of interest within the reference image is demarcated. The object of interest may be demarcated in the reference image in various manners. For example, in some embodiments, in addition to a reference image, an image mask that demarcates the object of interest in the reference image may also be provided to the signature encoding module. For example, an image mask may take the form of a matrix having elements that correspond to one or more pixels of the reference image. In this example embodiment, the matrix may be configured to designate certain pixels of the reference image that include the object of interest. In other embodiments, the object of interest may be demarcated within the reference image itself. Demarcation of the object of interest may occur prior to the reference image being provided to the signature encoding module 420.

Once the reference image and demarcation of the object of interest within the reference image are provided to the signature encoding module 420, the signature encoding module may generate a digital signature for the object of interest and for at least some context associated with the object of interest.

In some embodiments, the signature encoding module 420 may comprise a plurality of neural network layers configured to decompose the reference image and a representation therein of the object of interest and at least some of the context associated with the object of interest to extract features therefrom and to derive a digital signature representing a combination of the object of interest and at least some of the context associated with the object of interest. For example, in some embodiments, the digital signature may be derived based on the object of interest and at least some context associated with the object of interest, such as one or more objects in the reference image other than the object of interest.

In some embodiments, digital signatures may be generated by analyzing the reference image at different (e.g., higher) resolutions and extracting additional features from the reference image as the reference image is advanced from a courser resolution processed by one neural network layer to a finer resolution processed by another, subsequent neural network layer.

As FIG. 4 illustrates, a signature encoding module 420 is provided with a reference image 405 having a demarcated object 410 of interest. As shown, the signature encoding module 420 comprises a plurality of neural network layers in a pyramidal structure configured to decompose the reference image and a representation therein of the object of interest to extract features therefrom. As a result, the signature encoding module is configured to derive a digital signature 440 representing the object of interest that was demarcated in the reference image along with at least some of the context associated with the object of interest.

In some embodiments, the digital signature may comprise a sequence of bits and bytes unique to the object of interest and the associated context. In this regard, the digital signature may be derived based on both the object of interest and at least some of its context such that different digital signatures would be generated for identical objects of interest if those objects of interest were in different locations with different context associated therewith.

In some embodiments, the signature encoding module 420 and query processing module 430 may perform operations on multiple images (e.g., reference images 405 and query images 445) concurrently during the training process. In some embodiments, once a digital signature is generated by the signature encoding module, the digital signature may be stored (e.g., in memory and/or database 24) and used in other processes (e.g., query processing module processes) without having to use the original reference images and associated masks. In this regard, the stored digital signature provides a compact representation of an object of interest, thereby providing a technical advantage in terms of storage efficiency and the speed and efficiency with which digital signatures representative of objects of interest may be retrieved and processed, such as in conjunction with the identification of an object of interest within a query image. The digital signatures may be stored in combination with information defining the location at which the respective reference image was captured and, in some embodiments, in combination with a representation of the image, such as an encoded representation, e.g., a hash, of the image or the actual image itself.

In the training process, once the object of interest has been identified in the query image 445, at least one of the signature encoding module 420 or the query processing module 430 may be modified based upon a difference between the object of interest identified within the query image and the object of interest marked in the reference image. For example, the object of interest identified within the query image and the object of interest marked in the reference image may be compared using a loss function with at least one of the signature encoding module or the query processing module then being modified based upon a result of the loss function. In some embodiments, at least one of the signature encoding module and the query processing module may be modified to reduce a difference between the object of interest identified within the query image and the object of interest marked in the reference image.

By repeating the foregoing process a plurality of times by providing the signature encoding module 420 with a reference image with an object of interest being marked therein and then utilizing the resulting digital signature as an input along with one or more query images 445 to the query processing module 430 and then modifying the signature encoding module and/or the query processing module based upon a difference between the object of interest identified within the query image and the object of interest marked in the reference image, the signature encoding module and the query processing module may be trained to perform more accurately. In this regard, the signature encoding module may be trained to generate digital signatures that permit an object to interest to be accurately identified, and the query processing module may be trained to accurately identify the object of interest based upon a digital signature representative of the object of interest and at least some of the context associated therewith. Moreover, as a result of the training of the signature encoding module, the context (such as in terms of the amount of the context and/or the type of context) that is included with the object of interest in conjunction with the generation of the digital signature is a function of the training of the signature encoding process with the context that is included being defined to be that context that allows digital signatures to be generated that permit an object to interest to be accurately identified.

Although a signature encoding module 20 may be utilized to generate a plurality of digital signatures representative of respective objects of interest as well as at least some context associated therewith, the digital signatures may be generated in other manners and stored for subsequent reference by the query processing module 22 in other example embodiments. Additionally, even in instances in which the digital signatures are generated by a signature encoding module 20 that is trained concurrently with the training of the query processing module 22, the apparatus 10 including the query processing module 22 may subsequently reference the digital signatures in order to identify an object of interest in a query image that has been captured by an image capture device without further involvement by the signature encoding module 20.

In instances in which the object of interest within the image is a hierarchical object of interest, the apparatus 10 may include means, such as the processing circuitry 12, memory 14, query processing module 22, and/or the like, for identifying a sub-object of interest of the hierarchical object of interest based upon respective digital signatures of the one or more sub-objects of interest.

In some embodiments, the apparatus 10 includes means, such as the processing circuitry 12, memory 14, query processing module 22, and/or the like, for determining a defined location of the object of interest that within the image generated by the image capture device based upon locations associated with the one or more objects of interest that are depicted by the one or more reference images that have been identified. In some embodiments, at block 205, the apparatus optionally includes means, such as the processing circuitry 12, memory 14, the query processing module 22, and/or the like, for augmenting the image generated by the image capture device based upon the object of interest that has been identified therein and, in one embodiment, based upon the location of the object of interest identified within the image. The image may be augmented in various manners to identify the object of interest. For example, the image may be augmented by providing an overlay upon the image generated by the image capture device. Various types of overlays may be provided. For example, the image may be augmented by overlaying a representation of the object of interest that has been identified, thereby producing an augmented image 460 as shown in FIG. 4. For example, in some embodiments, the augmented image may comprise an image mask 465 demarking the object of interest within the image. In some embodiments, the portion of the image that is designated, such as by the augmentation, as being representative of the object of interest is that portion that illustrates the object of interest, but not the context associated therewith. Additionally or alternatively, the image may be augmented by providing information regarding the object of interest, such as information regarding the tenants of a building, information regarding the hours of operation of a business, etc., upon an overlay to the image. As another example, the image may be augmented by providing an overlay that includes advertising information upon the image. In this example, the object of interest may be a billboard and the overlay may include an advertisement so as to create a virtual billboard. As such, the apparatus, such as the processing circuitry, of an example embodiment may be configured to access information, such as stored by the memory, the database or the like, regarding respective objects of interest.

The apparatus 10 may also optionally include means, such as the processing circuitry 12, the user interface 18 or the like, for causing the augmented image to be displayed. The augmented image may be displayed upon a display associated with the image capture device or upon the display of another device. A user may therefore obtain additional information regarding an object of interest in a timely manner, such as in real time or near real time relative to the time at which the image of the object of interest was captured as a result of the processing efficiency provided by an example embodiment. By way of example, but not of limitation, a user may capture an image of a building while walking along a street. The method and apparatus of an example embodiment may then identify the building based upon a digital signature of the object of interest and at least some of the context associated therewith and then provide an augmented image to the user that provides information regarding the building, such as a list of tenants and their hours of operation.

However, in an instance in which the apparatus 10, such as the processing circuitry 12, the query processing module 22 or the like, fails to identify an object of interest within the image generated by the image capture device based upon respective digital signatures of one or more objects of interest and at least some context associated with the one or more objects of interest that are depicted by the one or more reference images that have been identified, the apparatus, such as the processing circuitry, may be configured to provide an indication that some aspect of the real world environment that is the subject of the image may have changed since the reference images were captured. In response to the indication that some aspect of the environment may have changed, the apparatus, such as the processing circuitry, may initiate an updating process in which one or more updated reference images of that portion of the environment that may have changed are captured. During the updating process, the apparatus, such as the processing circuitry, may also be configured to generate respective digital signatures of one or more objects of interest and at least some context associated with the one or more objects of interest that are depicted by the one or more updated reference images for use during subsequent analysis of images generated by the image capture device of that portion of the environment.

By appropriately utilizing a trained query processing module 22 to identify an object of interest from an image utilizing a digital signature of the object of interest and the context associated therewith as well as a database of predefined digital signatures of a plurality of objects of interest and the context associated therewith, the object of interest may be reliably identified from the image captured by an image capture device, such as an image capture device that is capable of being relocated. Thus, the database of digital signatures of various objects of interest (and the associated context) may be maintained, thereby providing for efficient storage of information associated with a wide variety of objects of interest without necessarily having to store the corresponding images. By utilizing the digital signatures, the objects of interest may subsequently be identified in received images captured by an image capture device in a manner that conserves processing resources and is more timely than at least some other image analysis techniques.

FIGS. 2 and 3 illustrate flowcharts depicting a method according to an example embodiment of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, although a supervised learning technique has been described in conjunction with the training of the signature encoding module 20 and the query processing module 22, various forms of unsupervised learning or partially supervised learning may, instead, be employed in other example embodiments. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving one or more images generated by an image capture device that is configured to be relocated;
determining an estimated location of the image capture device based on (i) location data associated with the one or more images and (ii) metadata including historical location data associated with the image capture device, wherein determining the estimated location of the image capture device comprises combining, with a filter, (i) the location data associated with the one or more images and (ii) the metadata;
identifying, based upon a representation of a respective image of the one or more images and respective representations of a plurality of reference images, one or more reference images that are associated with the estimated location;
identifying an object of interest within the respective image generated by the image capture device based upon respective digital signatures of one or more objects of interest and at least some context associated with the one or more objects of interest that are depicted by the one or more reference images that have been identified, wherein each digital signature is representative of both the object of interest and at least some context associated with the object of interest; and
determining a defined location of the object of interest within the respective image based upon locations associated with the one or more objects of interest that are depicted by the one or more reference images that have been identified.

2. The method according to claim 1, wherein the object of interest within the respective image is identified by a query processing module comprising a neural network that has been trained to recognize the object of interest utilizing the respective digital signature of the one or more objects of interest and at least some context associated with the one or more objects of interest that are depicted by the one or more reference images that have been identified.

3. The method according to claim 1 further comprising augmenting the respective image generated by the image capture device based upon the object of interest that has been identified therein.

4. The method according to claim 3 wherein augmenting the image generated by the image capture device comprises providing an overlay upon the respective image generated by the image capture device.

5. The method according to claim 1 wherein identifying one or more reference images comprises:
generating an encoded representation of the respective image; and
comparing the encoded representation of the respective image to encoded representations of the plurality of reference images to identify the one or more reference images.

6. The method according to claim 5 wherein identifying one or more reference images comprises separately applying a distance function to the encoded representation of the respective image and each of the encoded representations of the reference images, wherein comparing comprises comparing a result of the distance function between the encoded representation of the respective image and each of the encoded representations of the reference images.

7. The method according to claim 1 further comprising identifying the plurality of reference images based upon respective locations associated with the plurality of reference images being within a predefined distance and orientation of the estimated location and orientation of the image capture device.

8. The method according to claim 1 further comprising: accessing the respective representations of the plurality of reference images and the respective digital signatures of one or more objects of interest that are depicted by the one or more reference images that have been identified, wherein the respective representations of the plurality of reference images and the respective digital signatures of one or more objects of interest have been previously generated and stored in advance of receiving the respective image generated by the image capture device.

9. The method according to claim 1, wherein at least some of the one or more objects of interest that are depicted by the one or more reference images are hierarchical, wherein a hierarchical object of interest further defines one or more sub-objects of interest associated therewith, wherein respective digital signatures are associated with the one or more sub-objects of interest, and wherein the method further comprises identifying a sub-object of interest within the object of interest that has been identified based upon respective digital signatures of the one or more sub-objects of interest.

10. The method according to claim 1, wherein the filter comprises a Kalman filter.

11. An apparatus comprising processing circuitry and at least one memory including computer program code instructions, the computer program code instructions configured to, when executed by the processing circuitry, cause the apparatus to:
receive one or more images generated by an image capture device that is configured to be relocated;
determine an estimated location of the image capture device based on location data associated with the one or more images and historical location data associated with the image capture device;
identify, based upon a representation of a respective image of the one or more images and respective representations of a plurality of reference images, one or more reference images that are associated with the estimated location;
identify an object of interest within the respective image generated by the image capture device based upon respective digital signatures of one or more objects of interest and at least some context associated with the one or more objects of interest that are depicted by the one or more reference images that have been identified, wherein each digital signature is representative of both the object of interest and at least some context associated with the object of interest;
determine a defined location of the object of interest within the respective image based upon locations associated with the one or more objects of interest that are depicted by the one or more reference images that have been identified; and
modify the respective image generated by the image capture device by demarcating the object of interest that has been identified within the image and providing additional information associated with the object of interest.

12. The apparatus according to claim 11, wherein the processing circuitry further comprises a query processing module comprising a neural network that has been trained to recognize the object of interest utilizing the respective digital signature of the one or more objects of interest and at least some context associated with the one or more objects of interest that are depicted by the one or more reference images that have been identified.

13. The apparatus according to claim 11 wherein the computer program code instructions are configured to, when executed by the processing circuitry, cause the apparatus to augment the respective image generated by the image capture device by providing an overlay upon the respective image generated by the image capture device.

14. The apparatus according to claim 11 wherein the computer program code instructions configured to cause the apparatus to identify one or more reference images comprise computer program code instructions configured to, when executed by the processing circuitry, cause the apparatus to:
generate an encoded representation of the respective image; and
compare the encoded representation of the respective image to encoded representations of the plurality of reference images to identify the one or more reference images.

15. The apparatus according to claim 11 wherein the computer program code instructions are further configured to, when executed by the processing circuitry, cause the apparatus to identify the plurality of reference images based upon respective locations associated with the plurality of reference images being within a predefined distance and orientation of the estimated location and orientation of the image capture device.

16. The apparatus according to claim 11 wherein the computer program code instructions are further configured to, when executed by the processing circuitry, cause the apparatus to access the respective representations of the plurality of reference images and the respective digital signatures of one or more objects of interest that are depicted by the one or more reference images that have been identified, and wherein the respective representations of the plurality of reference images and the respective digital signatures of one or more objects of interest have been previously generated and stored in advance of receiving the respective image generated by the image capture device.

17. A computer program product comprising at least one non-transitory computer-readable storage medium having computer-executable program code instructions stored therein, the computer-executable program code instructions comprising program code instructions configured to:

receive one or more images generated by an image capture device that is configured to be relocated;

receive information regarding an estimated location of the image capture device;

generate a hashed representation of the one or more images;

identify, based upon a comparison of (i) the hashed representation of the one or more images and (ii) hashed representations of a plurality of reference images, one or more reference images that are associated with the estimated location;

identify an object of interest within the respective image generated by the image capture device based upon respective digital signatures of one or more objects of interest and at least some context associated with the one or more objects of interest that are depicted by the one or more reference images that have been identified, wherein each digital signature comprises a unique identifier that is representative of both the object of interest and at least some context associated with the object of interest; and determine a defined location of the object of interest within the respective image based upon locations associated with the one or more objects of interest that are depicted by the one or more reference images that have been identified.

18. A computer program product according to claim 17 wherein the computer-executable program code instructions further comprise program code instructions configured to augment the respective image generated by the image capture device based upon the object of interest that has been identified therein.

* * * * *